United States Patent [19]

Tada

[11] Patent Number: 4,939,590
[45] Date of Patent: Jul. 3, 1990

[54] IMAGE READING APPARATUS CAPABLE OF ELIMINATING MOIRE PATTERN

[75] Inventor: Kaoru Tada, Osaka, Japan

[73] Assignee: Minolta Camera Kabushiki Kaisha, Higashi, Japan

[21] Appl. No.: 236,647

[22] Filed: Aug. 25, 1988

[30] Foreign Application Priority Data

Aug. 28, 1987 [JP] Japan .................................. 62-215998

[51] Int. Cl.⁵ .......................................... H04N 1/393
[52] U.S. Cl. ....................................... 358/451; 358/454
[58] Field of Search ............... 358/280, 287, 283, 285, 358/284, 451, 454, 474, 486, 494

[56] References Cited

U.S. PATENT DOCUMENTS

| 4,080,634 | 3/1978  | Schreiber | 358/283 |
|-----------|---------|-----------|---------|
| 4,390,235 | 6/1983  | Minoura   | 350/6.1 |
| 4,417,281 | 11/1983 | Hama      | 358/287 |
| 4,496,983 | 1/1985  | Takenaka  | 358/287 |
| 4,520,399 | 5/1985  | Tida      | 358/280 |
| 4,527,885 | 7/1985  | Ayata et al. | 358/280 |
| 4,562,485 | 12/1985 | Maeshima  | 358/280 |
| 4,673,972 | 6/1987  | Yokomizo  | 358/75  |
| 4,682,243 | 7/1987  | Hatayama  | 358/287 |
| 4,704,637 | 11/1987 | Mizuno    | 358/280 |
| 4,771,473 | 9/1988  | Sugiura   | 358/287 |
| 4,807,046 | 2/1989  | Nakatani  | 358/280 |
| 4,812,915 | 3/1989  | Tada      | 358/285 |
| 4,862,285 | 8/1989  | Miyakawa  | 358/451 |

FOREIGN PATENT DOCUMENTS

| 57-11570   | 1/1982  | Japan . |
| 57-65959   | 4/1982  | Japan . |
| 57-91071   | 6/1982  | Japan . |
| 59-101959  | 6/1984  | Japan . |
| 59-123367  | 7/1984  | Japan . |
| 59-176978  | 10/1984 | Japan . |
| 61-6978    | 1/1986  | Japan . |

Primary Examiner—James J. Groody
Assistant Examiner—Kim Yen Vu
Attorney, Agent, or Firm—Price, Gess & Ubell

[57] ABSTRACT

When an original formed by using a dot screen is read, a key which corresponds to the screen line number of the dot screen is inputted. By the key input, a suitable magnification rate data based on the screen line number is set for eliminating moire patterns. An optical enlarging magnification rate and reducing magnification rate are determined based on the set magnification rate data. The image of the original is projected on an image sensor at this optical enlarging magnification rate and is converted into electrical data. The electrical data are reduced electrically at the reducing magnification rate to be outputted as the image data.

13 Claims, 10 Drawing Sheets

IMAGE READING APPARATUS CAPABLE OF ELIMINATING MOIRE PATTERN

CROSS REFERENCE TO RELATED COPENDING APPLICATION

A related copending application of particular interest to the present invention is U.S. Ser. No. 31430 entitled "Image Reading Apparatus Capable of Eliminating Moire Pattern" filed on Mar. 27, 1987 and assigned to the same applicant of the present application.

BACKGROUND OF THE INVENTION

1. Field of the Invention

The present invention relates to an image reading apparatus and, more specifically, to an image reading apparatus capable of eliminating moire pattern generated in reading dot images.

2. Description of the Prior Art

A digital copying machine has been known in which an original image is read by an image pickup device and the image is printed on a paper by a laser printer and the like based on the image data obtained therefrom.

However, there arises a problem in reading an original image such as a photograph or a painting having thick portions and thin portions provided as a dot image by a half tone etching method. More specifically, because of the relation between the pitch between each of the dots and the reading pitch by the image pickup device, or of a subtle deviation of phase based on the period and the like in half tone processing, a periodical pattern of thick and thin portions called moire pattern is generated, providing trouble in viewing.

A method has been proposed to prevent the generation of the moire pattern, in which dimension or pattern of a Dither matrix is changed in half tone processing. However, the moire pattern cannot be eliminated by this method when the reading pitch (the pitch between pixels in the image pickup device) itself is the cause of the moire pattern.

Under another method, the moire pattern has been eliminated by arranging a filter for eliminating the moire pattern in a light path in reading the original image and by gradation of the image by dispersing the image focused on one pixel of the image pickup device onto adjacent pixels. However, the moire pattern cannot be eliminated in all of the images having thick portions and thin portions even by this method when a plurality of images with thick portions and thin portions having different dot pitches are included in the original image.

In view of the foregoing, the applicant of the present invention proposed in the above mentioned related application, an image processing apparatus capable of eliminating moire pattern employing optical enlarging means for enlarging an original image to be read by an image pickup device and electrical reducing means for reducing the image by thinning out image data read by the image pickup device. Accordingly, by adjusting the rates of magnification of the optical enlarging means and the electrical reducing means in association with the dot pitch of the original, the moire pattern can be effectively eliminated. However, in the image processing apparatus of the prior application, the magnification rate to be set for the optical enlarging means and the electrical reducing means must be determined by trial and error process every time the apparatus is used. Such adjustment requires a number of setting of the magnification rate and a number of trial prints in order to eliminate the moire pattern. Much time and labor is required for effective elimination of the moire pattern.

For a user employing dot screens for providing pictures and photographs, and where such user knows the number of lines (per inch) of the screen used, it is very convenient if the magnification rate for eliminating the moire pattern can be set by using the number of lines of the screen.

SUMMARY OF THE INVENTION

An object of the present invention is to provide an image reading apparatus capable of providing images without moire pattern.

Another object of the present invention is to provide an image reading apparatus capable of effectively eliminating the moire pattern.

A further object of the present invention is to provide an image reading apparatus capable of effectively eliminating the moire pattern in an original provided by a dot screen without requiring trial and error process.

A still further object of the present invention is to provide an image reading apparatus capable of easily eliminating the moire pattern in an original formed by a dot screen without requiring trial and error process.

In order to attain the above described objects, the image reading apparatus in accordance with the present invention comprises an image sensor, optical projecting means, data reducing means, magnification rate data setting means and control means. The image sensor converts images of an original into electrical data. The optical projecting means projects images of the original on the image sensor and is capable of changing the magnification rate of projection. The data reducing means electrically reduces the electrical data converted by the image sensor. The magnification rate data setting means sets magnification rate data in correspondence with the number of lines of the dot screen in order to eliminate the moire pattern generated when the images of the original formed by using the dot screen are converted to electrical data by the image sensor. The control means controls the optical projection means such that it projects the images of the original at a magnification rate based on the magnification rate data set by the magnification rate data setting means. The control means also controls the data reducing means such that it reduces the electrical data at a reducing magnification rate in correspondence with the projection magnification rate of the optical projecting means. Since the image reading apparatus structured as described above sets the magnification rate data for eliminating the moire pattern based on the number of lines of the dot screen, the moire pattern can be easily and effective eliminated.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
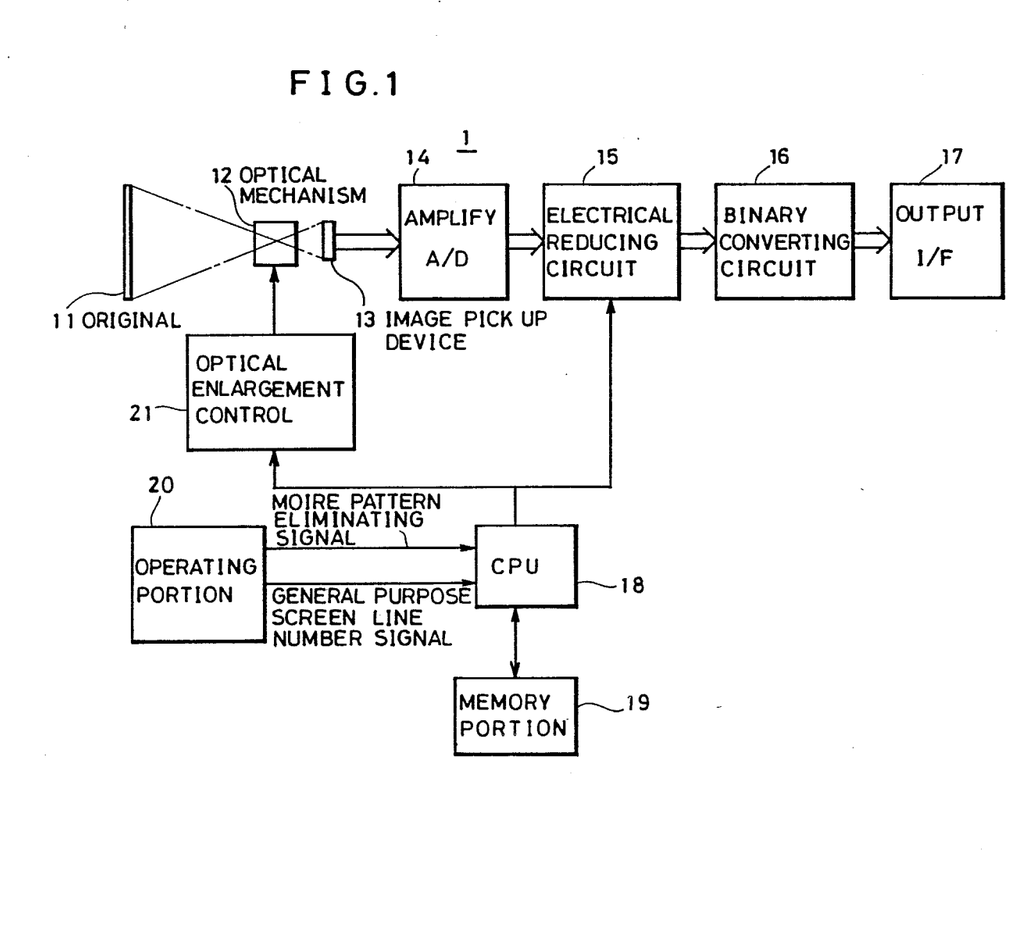
FIG. 1 is block diagram showing an electrical circuit of the image reading apparatus in accordance with one embodiment of the present invention.

FIG. 1 is a block diagram showing an electrical circuit of the image reading apparatus in accordance with one embodiment of the present invention. The image reading apparatus 1 comprises an optical mechanism 12 capable of enlarging and reducing images of an original by means of a zooming mechanism; an image pickup device (CCD) 13 which reads the images of the original through the optical mechanism and converts the same into electrical signals in correspondence with the density thereof; an A/D converter 14 which converts the analog output signals of the image pickup device 13 into image data of digital signals; an electrical reducing circuit 15 which reduces the images by thinning the image data out; a binary converting circuit 16 which half tone processes the density of the image to convert the same to binary signals; an output interface portion 17 which outputs the binary signals from the binary converting circuit 16 to an output device such as a printer; a CPU 18 which controls all these components; a memory portion 19 for storing the magnification rate; an operating portion 20 which transmits a moire pattern eliminating signal, a general purpose screen line signal and so on to the CPU 18 by a key switch and the like; and an optical enlargement control portion 21 for controlling the optical mechanism 12.

Figure 2:
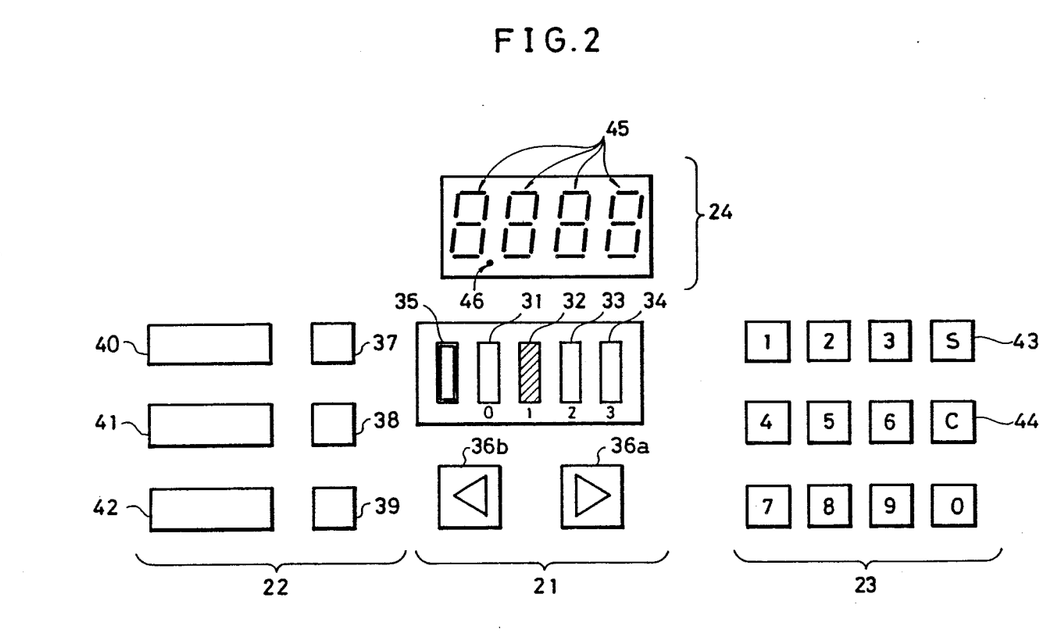
FIG. 2 shows a definite structure of an operating panel in an operating portion of FIG. 1.

FIG. 2 shows a definite structure of the operating panel of the operating portion in FIG. 1.

The operating panel comprises a moire pattern eliminating magnification rate setting portion 21, a screen line number selecting portion 22, numerical input portion 23 and a display portion 24.

The moire pattern eliminating magnification rate setting portion 21 comprises fixed magnification rate keys 31, 32, 33 and 34, an upkey 36a and a downkey 36b which finely adjust the magnification rate selected by the fixed magnification rate key by "up" and "down" adjustment. The portion 21 further comprises a mode key 35 which activates the screen line number selecting portion 22. When any of the keys 31 to 35 is pressed, other keys are turned off, and a light emitting element arranged on the rear side of the pressed key displays that the key is pressed.

The screen line number selecting portion 22 comprises three keys 37, 38 and 39. The screen line numbers which are frequently used and the magnification rates which are most suitable for eliminating the moire pattern of the dot images provided by using those screen line numbers are stored in correspondence with the respective keys as will be described later. The entry portions 40, 41 and 42 are display areas for entering the screen line number set in correspondence with each of the keys 37, 38 and 39 is manuscript form.

The numerical input portion 23 comprises numerical keys 0 to 9, a set key 43 used for inputting the numeral and a cancel key 44.

The display portion 24 comprises 7 segment display elements 45 for 4 figures and a dot display element 46 which displays a decimal point when the magnification rate is inputted. The display portion 24 displays the selected magnification rate when the magnification rate is selected by the magnification rate setting portion 21 or by the screen line number selecting portion 22. When the screen line number and the magnification rate are set for respective keys of the screen line number selecting portion 22, the display portion 24 displays the numerals inputted from the numerical input portion 23.

Meanwhile, the numerical input portion 23 is not used in the normal operating mode, and therefore, it may be covered with a lid or may be provided inside of the apparatus.

The moire pattern eliminating magnification rate is set by the above described operating panel. When the number of lines of the screen used for forming the dot image to be read by the image reader is unknown, the moire pattern eliminating magnification rate is set by the magnification rate setting portion 21. The keys 31, 32, 33 and 34 are respectively in correspondence with fixed magnification rates of 1.000 (there is no need of eliminating moire pattern), 1,250, 1.500 and 1.750, and when the desired magnification rate for eliminating the moire pattern is different from the fixed magnification rate selected by each of the keys, the desired magnification rate can be set by operating the upkey 36a or the downkey 36b.

Meanwhile, if the number of lines of the screen of the dot image is known and the value is set in correspondence with any of the keys 37, 38 and 39, the mode key 35 is pressed to select the screen line number selecting mode. Thereafter, the screen line number is selected by pressing the corresponding key. Since the optimal magnification rate for eliminating the moire pattern has been stored beforehand for the selected screen line number, the above described operation enables the immediate selection of the moire pattern eliminating magnification rate.

Figure 3:
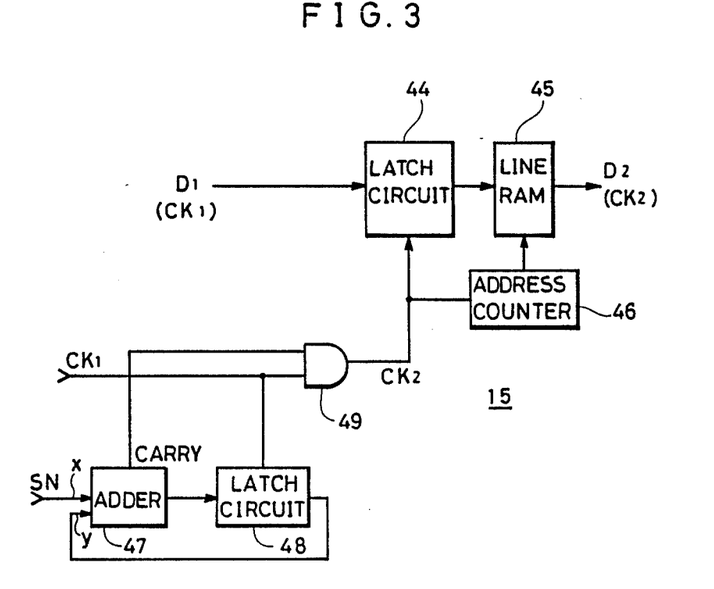
FIG. 3 is a block diagram showing the structure of the electrical reducing circuit of FIG. 1.
Figure 4:
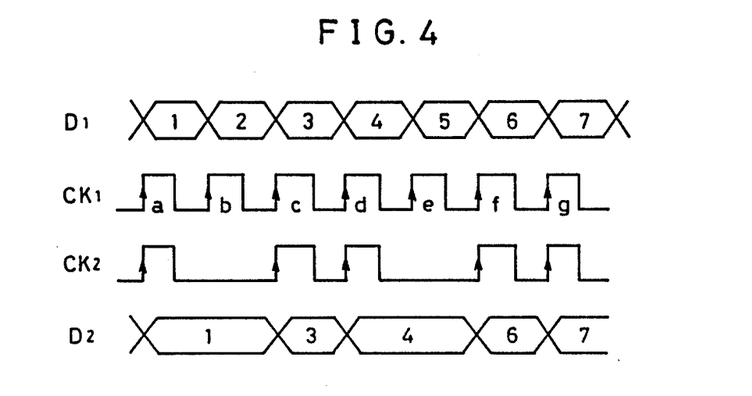
FIG. 4 is a time chart showing inputs and outputs of main portions of the electrical reducing circuit of FIG. 3.

FIG. 3 is a block diagram of the electrical reducing circuit of FIG. 1, and FIG. 4 is a time chart showing inputs and outputs of the main portion thereof.

The image data D1 enters the latch circuit 44 at the timing of the clock CK1. The reducing data SN from the CPU 18 which will be described later, is inputted to a circuit for generating a clock CK2 comprising an adder 47, a latch circuit 48 and an AND gate 49. The adder 47 has the capacity of 1024 and adds the reducing data SN to the output of the latch circuit 48 to output the same to the latch circuit 48. The timing of output of the latch circuit 48 is applied by the clock CK1. When the added value in the adder 47 reaches 1024, a carry signal is sent to the AND gate 49. The AND output of the carry signal and the clock CK1 becomes the clock CK2.

The latch circuit 44 latches the image data D1 by the clock CK2 and holds the data until the next clock CK2 is inputted. Therefore, the image data D1 which is available at the input of the latch circuit 44 at the timing of the clock CK1 and before the next clock CK2 is inputted; will be discarded.

The image data outputted from the latch circuit 44 at the timing of clock CK2 is written in a line RAM 45 having the storage capacity of 1 line. On this occasion, the clock CK2 is inputted to the address counter 46 of the line RAM 45, and the data of reduced images which is thinned out in accordance with a prescribed manner (CK2−CK1) is written in the line RAM 45.

In this embodiment, the reducing magnification rate (1/N) is processed by 10 bits, and the magnification rate can be set by the order of 1/1024. FIG. 4 shows a timing chart when the moire pattern eliminating magnification rate Nd is designated as 1.5. Namely, the reducing data SN is set at 683 and the output of the clock CK2 is obtained as follows.

The reference characters x and y denote addition data shown in FIG. 3 and characters "a" to "g" correspond to the pulse output of the clock CK1 shown in FIG. 4.

| x y | CK1 | CK2 pulse output |
|---|---|---|
| 0 + 0 = 0 (corresponds to 1024 ⟶ carry) | a | present |
| 683 + 0 = 683 ↓ | b | — |
| 683 + 683 = 342 + 1024 ⟶ carry ↓ | c | present |
| 683 + 342 = 1 + 1024 ⟶ carry ↓ | d | present |
| 683 + 1 = 684 ↓ | e | — |
| 683 + 684 = 343 + 1024 ⟶ carry ↓ | f | present |
| 683 + 343 = 2 + 1024 ⟶ carry | g | present |

Figure 5:
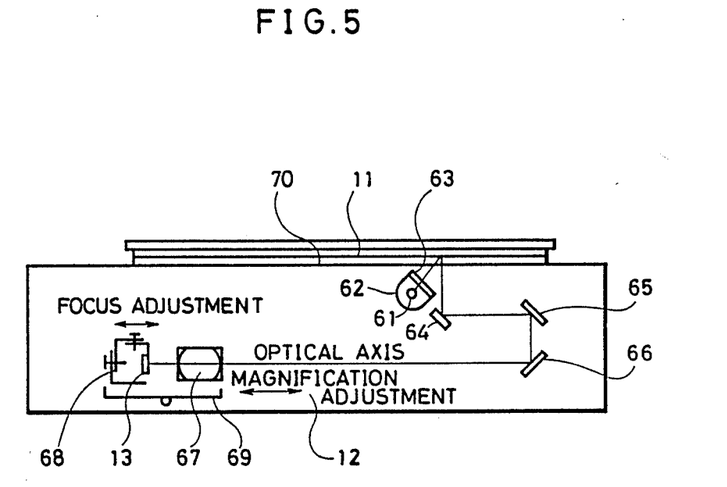
FIG. 5 is a cross sectional view showing a schematic structure of an image reader including the optical mechanism of FIG. 1.

FIG. 5 is a cross sectional view showing a schematic structure of the image reader including the optical mechanism of FIG. 1.

A halogen lamp 61 which is the source of exposure illuminates an original 11 placed on an original glass plate 70. The halogen lamp 61 is provided with a reflecting mirror 62 and an infrared filter 63. The light reflected from the original 11 is successively reflected by the mirrors 64, 65 and 66, and thereafter it enters an image pickup device 13 through a lens 67. The image pickup device 13 is held by a holder portion 68 and the position and angle thereof are adjusted. The holder portion 68 and the lens 67 are attached to a carriage 69. The magnification rate is adjusted by moving the carriage 69 in the direction of the optical axis by a moving mechanism, not shown, based on a lens magnification rate signal from a CPU. The focus adjustment is carried out by moving the holder portion 68 in the direction of the light axis by a motor, not shown, provided on the carriage 69. As is well known, the halogen lamp 61 and the mirrors 64, 65 and 66 are moved in the left and right direction of the figure for scanning in images of the indicia on the original 11. The operation of the moire pattern eliminating means constituted by these optical mechanism 12 and the electrical reducing circuit 15 will be described in the following.

The CPU 18 determines the optical enlarging magnification rate N based on the moire pattern eliminating magnification rate Nd selected by the operating panel. Now, when the printing magnification rate is not the equal scale magnification, the optical enlarging magnification rate N is the product of the printing magnification rate Na and the moire pattern eliminating magnification rate Nd. If the calculated value exceeds the limit of the optical mechanism 12, the enlarging magnification rate N is the maximum possible magnification rate. Thereafter, the reducing magnification rate of the electrical reducing circuit 15 is calculated. The reducing magnification rate is the inverse number of the moire pattern eliminating magnification rate, that is, 1/Nd. The reducing data SN inputted to the adder is the product of the reducing magnification rate 1/Nd and "1024". The magnification rates N and 1/Nd obtained in this manner are outputted to the optical mechanism 12 and the electrical reducing circuit 15 as the lens magnification rate signal and the reducing signal, respectively. The images of the indicia on the original 11 are optically enlarged N times by the optical mechanism 12 to be read by the image pickup device 13, and they are reduced to 1/Nd by the electrical reducing circuit 15 after passing through the A/D converter 14.

The images of the indicia on the original 11 are enlarged by the optical mechanism 12 and read by the image pickup device 13 with high resolution, whereby the moire pattern caused by the deviation of the phase between the dot pitch of the original 11 and the reading pitch can be eliminated. Since the images are reduced by the electrical reducing circuit 15, the size of the images of the original 11 are not changed by the moire pattern eliminating means. As for the periodicity of the Dither processing, the low frequency components of the read data are eliminated by the optical enlargement and the phase of the read data changes to some extent by the electrical reduction, whereby there will be no moire pattern in simple reading.

If the moire pattern is eliminated in the printed image, the image processing is terminated by the user. If there is still a moire pattern, the moire pattern eliminating keys 31 to 34 are operated and the image processing is carried out again with a different eliminating magnification rate Nd inputted from the memory portion 19.

It is said in general that the moire pattern will not be generated when the reading pitch is eight times as close as the dot pitch of the original 11. The generation of the moire pattern can be prevented when the original has the dot pitch more sparse than ⅛ of the resolution at the possible maximum magnification rate.

Figure 6:
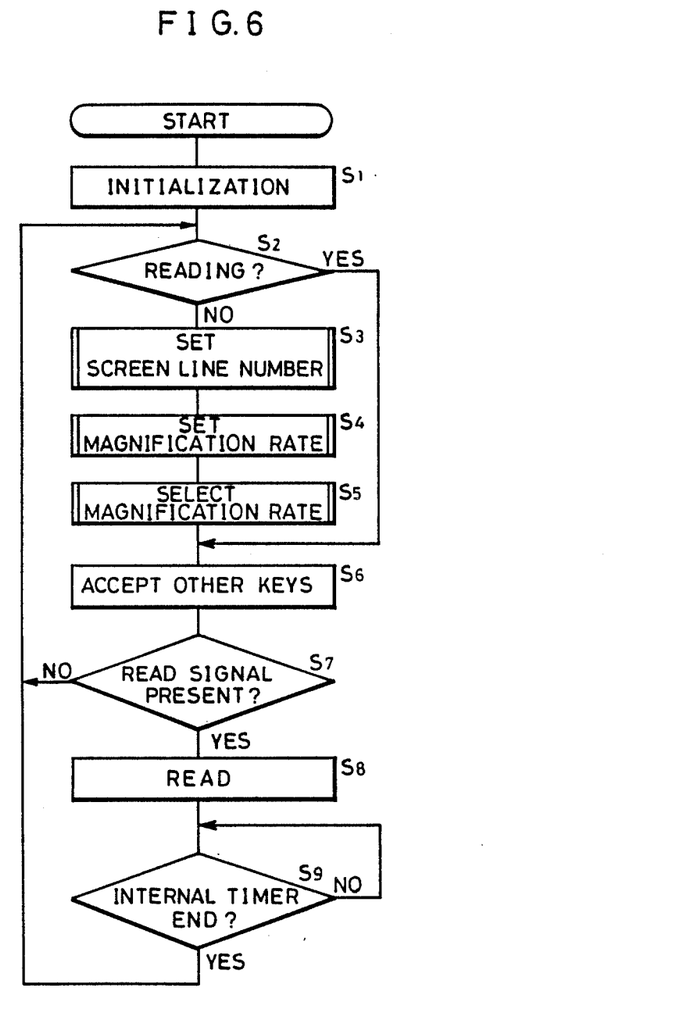
FIG. 6 is a flow chart of the input of a moire pattern eliminating signal and moire pattern eliminating reading in accordance with one embodiment of the present invention.

FIGS. 6 to 10 are flow charts showing the processes effected by the CPU 18. FIG. 6 is a flow chart of the input of the moire pattern eliminating signal and the moire pattern eliminating reading.

When the power is turned on at step S1, the initialization of respective portions, magnification rate adjustment and the focus adjustment are carried out.

In step S2, it is determined whether the original is being read or not. When it is being read, the reading operation is continued, and other operations such as the generation of the moire pattern eliminating signal, the input of the mode selection key are not effected.

In step S3, the screen line number routine is effected for storing the frequently used screen line number in the memory portion 19.

In step S4, the magnification rate set routine is effected for storing the magnification rate corresponding to the frequently used screen line number inputted in the step S3.

In step S5, a magnification rate select routine is effected in which the magnification rate corresponding to the input from the keys 31 to 34 and 37 to 39 for setting the moire pattern eliminating magnification rate is selected from the memory portion 19 to be set.

In step S6, signals and keys other than the moire pattern eliminating signal, are processed for example the original density level, the size of the read paper, selection of binary/half tone processing, and so on.

In steps S7 and S8, the image reading sequence is carried out when there is a reading signal.

In step S9, the flow returns to the step S2 as the internal timer is terminated, whereby making uniform the time required for one routine.

Figure 7:
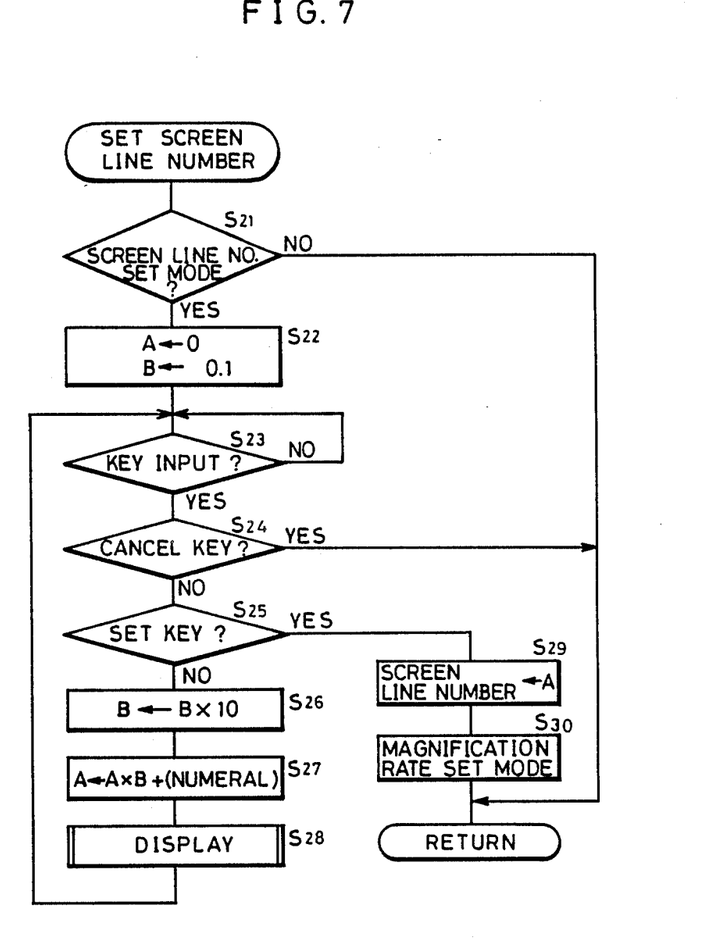
FIG. 7 is a flow chart of a screen line number set routine of FIG. 6.

FIG. 7 is a flow chart of the screen line number set routine.

When the decision is YES in the step S21 determining whether it is the screen line number set mode or not, then the screen line number register A and the register B for the number of figures are respectively initialized at "0" and "0.1", respectively.

Thereafter, whether there is a key input or not is determined (S23). If it is the cancel key 44, the control returns to the main flow (step S24). If it is the set key 43 (YES in step S25), it is determined that the setting of the screen line number is finished, and the present value of the screen line number register A is stored in the memory portion 19 (S29), the mode is set at the magnification rate set mode (S30), and the flow returns to the main flow.

If it is a ten key (numeral) (NO in the step S25), then, the screen line number calculating routine from step S26 will be carried out.

In steps S26 and S27, the value of the register B for the input number of figures is multiplied by 10 to be updated, and a product of this value B and the value of the register A is added to the value of the pressed numerical key, with the resulting value inputted to the register A. In step S28, this value of the register A is displayed.

By repeating steps S23 to S28, the value of the screen number is inputted.

Figure 8:
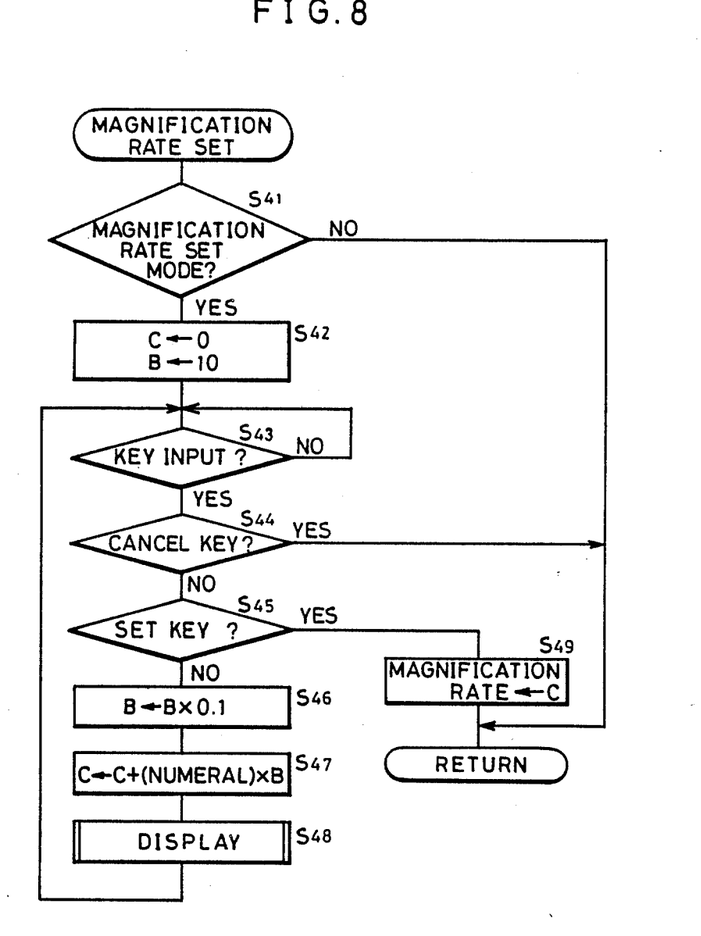
FIG. 8 is a flow chart of a magnification rate set routine of FIG. 6.

FIG. 8 is a flow chart of the magnification rate set routine.

This routine is, almost the same process as the screen line number set routine shown in FIG. 7. However, since the magnification rate is a decimal, the equation will be a little different. In this routine, "C" represents a magnification rate register, which will be treated in a manner similar to the screen line number register A.

The flow of FIGS. 7 and 8 is effected by the respective keys 37, 38 and 39, the screen line numbers L37, L38 and L39 and the magnification rates P37, P38 and P39 corresponding to the respective keys are stored in the memory portion 19.

Figure 9A:
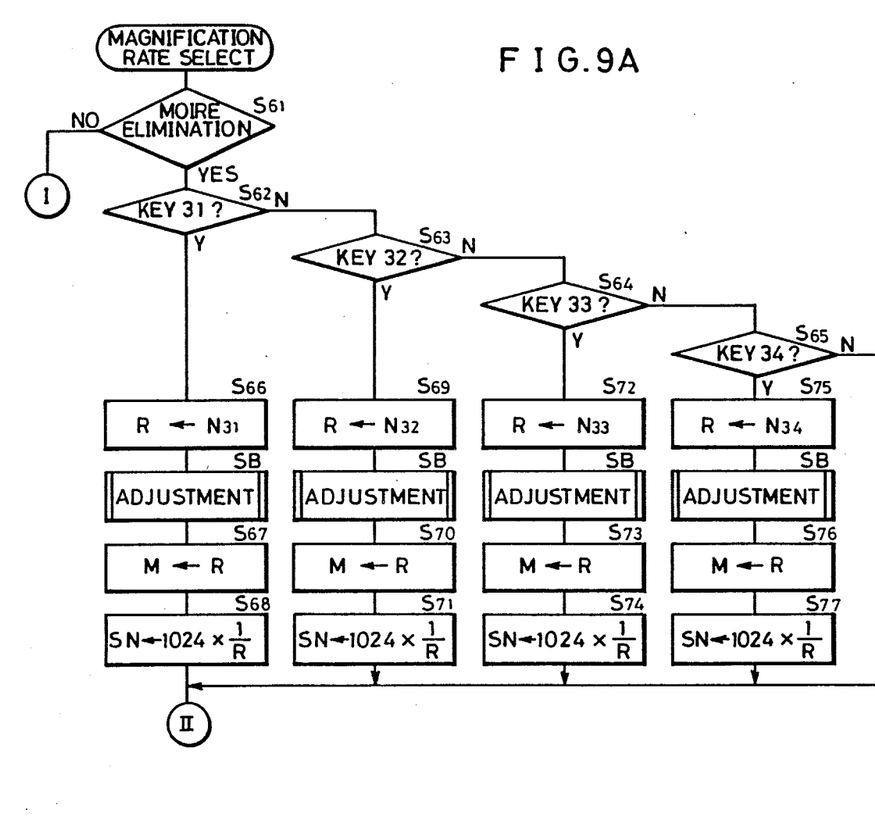
FIGS. 9A and 9B are flow charts of a magnification rate select routine of FIG. 6.
Figure 9B:
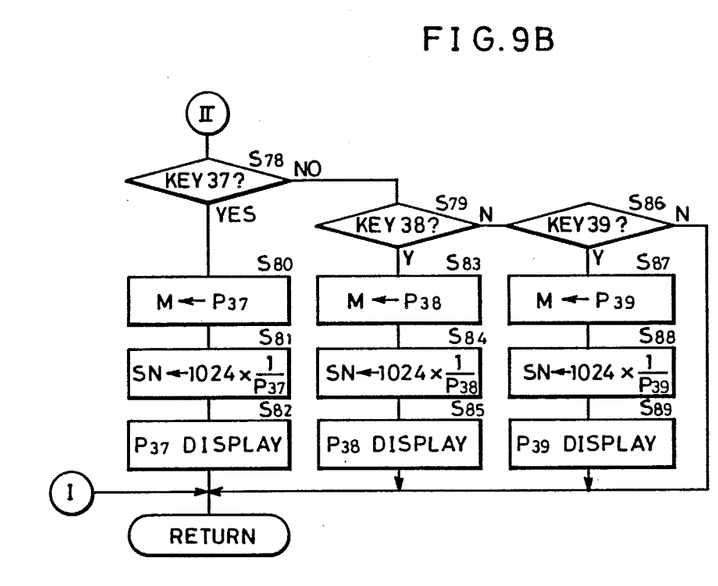

FIGS. 9A and 9B show a flow chart of the magnification rate select routine for selecting the magnification rate by using the moire pattern eliminating magnification rate setting portion 21.

In step S61, it is determined whether any one of the moire pattern eliminating keys 31 to 34 or the mode key 35 is turned on or not, and if one is not turned on, the flow returns to the main flow.

In steps S62 to S65, it is determined which of the keys 31 to 34 is turned on. If the key 31 is on, the magnification rate N31 which is stored in correspondence with the key 31 in the memory portion 19 is inputted to the register R in the next step S66.

Figure 10:
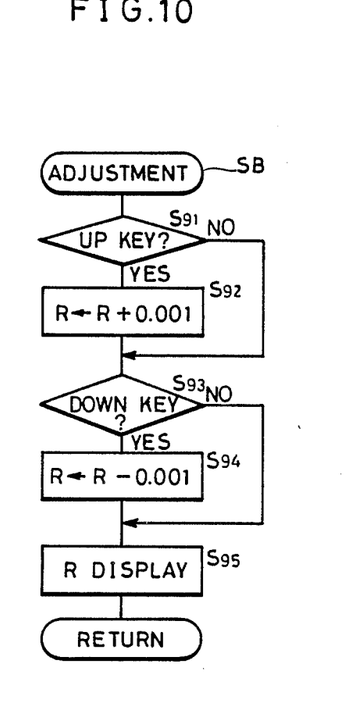
FIG. 10 is a flow chart of an adjustment routine shown in FIG. 9A.

FIG. 10 is a flow chart showing the content of the fine adjustment subroutine SB.

If it is determined that upkey is on in the step S91, then 0.001 is added to the value of the register R in the step S92. Meanwhile, if the downkey is on (step S93), 0.001 is subtracted from the value of the register R (step S94). This value is displayed on the numerical display portion 24 (step S95).

Returning to FIG. 9A, the finely adjusted value of the register R is registered in an area M of the memory portion 19 as the moire pattern eliminating magnification rate in step S67. Thereafter, a value obtained by multiplying the inverse number 1/R of the value of the register R by 1024 is registered in an area SN of the memory portion 19 as the value SN to be outputted to the adder 47 in step S68. Respective process steps are executed for the respective keys 32, 33 and 34 in the similar manner as described above.

Thereafter, the selection of the moire pattern eliminating magnification rate by the keys 37, 38 and 39 of the screen line number selecting portion 22 is checked. In steps S78, S79 and S86, it is checked which of the keys is turned on. For example, if the key 37 is turned on, the magnification rate P37 stored in the memory portion 19 is called out and registered in said area M in the step S80. In the step S81, a value obtained by multiplying the inverse number of the magnification rate P37 by 1024 is registered in said area SN. The magnification rate P37 is transmitted to the numerical display portion 24 to be displayed (step S82). Similar processes are carried out for the turning on of the keys 38 and 39.

As is apparent from the above description, the fixed magnification rates N31, N32, N33 and N34 in correspondence with keys 31, 32, 33 and 34 are stored beforehand in the memory portion 19 and the screen line numbers L37, L38 and L39 and the magnification rates P37, P38 and P39 set in correspondence with the keys 37, 38 and 39 are held until they are newly reset. Meanwhile, the memory portion 19 has temporary memory areas M and SN, in which the optical enlarging magnification rate M and the electrical reducing data SN set by the respective keys are stored. The CPU 18 carries out the moire pattern eliminating operation using the values in those areas. The values in the areas M and SN are held until different moire pattern eliminating magnification rate is selected by different keys.

As is shown in the above described embodiment, according to the present invention, the most effective magnification rate for eliminating the moire pattern can be easily selected for the screen line number of the original in reading the original, whereby the time and labor can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus capable of eliminating a moire pattern, comprising:
   an image sensor for converting an image of an original into electrical data;
   optical projecting means for projecting the image of the original on said image sensor and capable of changing a magnification rate of projection;
   data reducing means for electrically reducing the electrical data converted by the image sensor;
   magnification rate data setting means for setting, in order to eliminate a moire pattern generated at the time when the image of the original formed by using a dot screen is converted by said image sensor, magnification rate data in correspondence with a screen line number of said dot screen, said magnification rate data setting means including an input key provided in correspondence with the number of lines of said dot screen;
   memory means for storing, in correspondence with said input key, magnification rate data suitable for eliminating the moire pattern based on said screen line number in correspondence with said input key, said magnification rate data setting means outputting the magnification rate data stored in said memory means in response to an input by said input key, and
   control means which controls said optical projecting means so that said optical projecting means projects the image of the original at the projection magnification rate based on the magnification rate data set by said magnification rate data setting means and controls said data reducing means such that said reducing means reduces the electrical data at the reducing magnification rate in correspondence with the projection magnification rate of said optical projecting means.

2. An image reading apparatus according to claim 1, further comprising
   data entry means for storing in said memory means the magnification rate data in correspondence with said input key.

3. An image reading apparatus according to claim 2, wherein
   said data entry means comprises
   numerical input means for inputting arbitrary numerical values, and
   designating key storing said memory means with the numerical value inputted by said numerical value inputting means as the magnification rate data in correspondence with said input key.

4. An image reading apparatus according to claim 3, wherein
   said data entry means further comprises display means for displaying the numerical value inputted by said numerical input means.

5. An image reading apparatus according to claim 1, wherein
   said magnification rate data setting means further comprises input means for directly inputting an arbitrary magnification rate data, and said magnification rate data setting means can set the magnification rate data regardless of the screen line number of the dot screen.

6. An image reading apparatus according to claim 5, wherein
   said input means comprises an adjustment key capable of finely adjusting the value of the inputted magnification rate data.

7. An image reading apparatus according to claim 1, wherein
   the value of said reducing magnification rate is an inverse number of the value of said magnification rate data.

8. An image reading apparatus according to claim 7, wherein
   the value of said projection magnification rate is equal to the value of said magnification rate data.

9. In an image reader for reproducing indicia on a document, the improvement comprising:
   means for optically projecting an image of the indicia of a document;
   means for converting the projected optical image into electrical signals;
   means for varying the size of the projected optical image prior to converting the image into electrical signals;
   means for controlling the varying means to achieve a specific image to document size rate;
   means for setting and storing, for subsequent use by a user, an image to document size rate that will resolve a moire pattern problem created by an image of a document having a particular periodic density pattern including one or more input keys that correspond to a predetermined moire pattern eliminating image to document size rate suitable for elimination of moire patterns caused by a particular periodic density pattern;
   memory means for storing the image to document size rate associated with a particular input key and for subsequent output to the controlling means;
   means for accessing the stored rate set by the user and for providing the stored rate to the controlling means, and
   means for processing the electrical signals to compensate for the variation in the size of the optical image.

10. The invention of claim 9, further comprising:
    data entry means for storing in said memory means the predetermined moire pattern eliminating image to document size rate corresponding to a particular input key.

11. The invention of claim 10 wherein said data entry means comprises:
    numerical input means for inputting numerical values corresponding to the predetermined moire pattern eliminating image to document size rate, and
    means for designating the particular input key to which the image to document size rate shall correspond.

12. The invention of claim 11 wherein said data entry means further includes:
    a display means for displaying the numerical value inputted by the numerical input means.

13. The invention of claim 9 further comprising:
    means for selecting a desired printing magnification or reduction rate, and
    means for providing the desired printing magnification or reduction rate to the controlling means.

* * * * *